(12) United States Patent
Cheng et al.

(10) Patent No.: US 11,423,436 B2
(45) Date of Patent: Aug. 23, 2022

(54) INTERPRETABLE CLICK-THROUGH RATE PREDICTION THROUGH HIERARCHICAL ATTENTION (71) Applicant: NEC Laboratories America, Inc., Princeton, NJ (US)

(72) Inventors: Wei Cheng, West Windsor, NJ (US); Haifeng Chen, Princeton Junction, NJ (US)

(73) Assignee: NEC Corporation

( * ) Notice: Subject to any disclaimer, the term of this patent is extended or adjusted under 35 U.S.C. 154(b) by 388 days.

(21) Appl. No.: 16/787,657

(22) Filed: Feb. 11, 2020

(65) Prior Publication Data

US 2020/0265466 A1 Aug. 20, 2020

Related U.S. Application Data

(60) Provisional application No. 62/807,258, filed on Feb. 19, 2019.

(51) Int. Cl.
*G06Q 30/02* (2012.01)
*G06N 5/02* (2006.01)
*G06N 20/00* (2019.01)

(52) U.S. Cl.
CPC .......... *G06Q 30/0246* (2013.01); *G06N 5/02* (2013.01); *G06N 20/00* (2019.01); *G06Q 30/0202* (2013.01)

(58) Field of Classification Search
CPC .. G06Q 30/0246; G06Q 30/0202; G06N 5/02; G06N 3/0445; G06N 3/0481; G06N 3/08; G06N 20/00

(Continued)

(56) References Cited

U.S. PATENT DOCUMENTS

2019/0354885 A1* 11/2019 Li ........................... G06F 17/16

FOREIGN PATENT DOCUMENTS

CN 106874905 B * 6/2019

OTHER PUBLICATIONS

Weiping Song, AutoInt: Automatic Feature Interaction Learning via Self-Attentive Neural Networks, 2018 (Year: 2018).*

(Continued)

*Primary Examiner* — Tarek Elchanti
(74) *Attorney, Agent, or Firm* — Joseph Kolodka (57) ABSTRACT

A system is provided for interpretable viewing interest. A transformer with multi-head self-attention derives different hierarchical orders of input features. Hierarchical attention layers (i) aggregate the different hierarchical orders to obtain aggregated single-order feature representations and (iii) derive aggregation attention weights for the different hierarchical orders based on an applied order of the hierarchical attention layers. An attentional scoring layer evaluates the aggregated representations to output a significance of each order with respect to various CTR predictions. A hierarchical interpretation layer determines a respective importance of each input feature in various combinations from which the various CTR predictions are derived based on the aggregation attention weights and the significance of each order. A display device displays each of the various combinations for the various CTR predictions along with the respective importance of each of the constituent one of the input features in the various input feature combinations.

19 Claims, 5 Drawing Sheets

(58) Field of Classification Search
USPC .......................................................... 705/15
See application file for complete search history.

(56) References Cited

OTHER PUBLICATIONS

Cheng et al., "Ranking Causal Anomalies via Temporal and Dynamical Analysis on Vanishing Correlations", KDD '16, Aug. 2016, pp. 1-10.
Cheng et al., "Wide & Deep Learning for Recommender Systems", arXiv:1606.07792v1 [cs.LG] Jun. 24, 2016, pp. 1-4.
Guo et al., "DeepFM: A Factorization-Machine based Neural Network for CTR Prediction", Proceedings of the Twenty-Sixth International Joint Conference on Artificial Intelligence (IJCAI-17), Aug. 2017, pp. 1725-1731.
Lian et al., "xDeepFM: Combining Explicit and Implicit Feature Interactions for Recommender Systems", arXiv:1803.05170v3 [cs.LG] May 30, 2018, pp. 1-10.
Rendle, "Factorization Machines", ICDM, Proceedings of the 2010 IEEE International Conference Data Mining, Dec. 2010, pp. 1-6.
Xiao et al., "Attentional Factorization Machines: Learning the Weight of Feature Interactions via Attention Networks", arXiv:1708.04617v1 [cs.LG] Aug. 15, 2017, pp. 1-7.

* cited by examiner

INTERPRETABLE CLICK-THROUGH RATE PREDICTION THROUGH HIERARCHICAL ATTENTION

RELATED APPLICATION INFORMATION

This application claims priority to U.S. Provisional Patent Application No. 62/807,258, filed on Feb. 19, 2019, incorporated herein by reference herein its entirety.

BACKGROUND

Technical Field

The present invention relates to recommender systems and more particularly to interpretable click-through rate prediction through hierarchical attention.

Description of the Related Art

Click-Through Rate (CTR) refers to accurately estimating the probability of a user clicking on a particular recommender item or advertisement. CTR plays a significant role in recommender systems such as online advertisements since it directly affects the revenue of advertising agencies. In order to attain a high CTR prediction accuracy, the complexity of proposed models has been ever increasing. Along with the growth of CTR prediction model complexity, the limitation of interpretability is gaining seriousness. The weights and activations of neurons in those models are deemed non-explainable so that reasonable interpretations of their decision making processes are hard to find. The lack of persuasive rationales to explain the outcomes of the models casts shadow on the reliability and security of the predictions. In online marketing and advertising scenarios, unexplainable recommendations provided by deep recommender systems may not have severe effect. However, untrustworthy recommendations can lead to serious consequences such as the loss of health and wealth in scenarios of medication recommendation and financial services or products recommendation. Since CTR prediction is a critical component of recommender systems, interpretability of CTR prediction is also a necessity in aforementioned cases. Thus, there is a need for interpretable CTR prediction that indicates why a particular recommendation was made.

SUMMARY

According to an aspect of the present invention, a system is provided for interpretable viewing interest. The system includes a transformer with multi-head self-attention configured to derive different hierarchical orders of input features by learning various semantic interactions of the input features in different semantic subspaces. The system further includes a plurality of hierarchical attention layers configured to aggregate the different hierarchical orders of the input features to obtain aggregated single-order feature representations starting from a first order and continuing to a k-th order and derive aggregation attention weights for the different hierarchical orders of the input features based on an applied order of the plurality of hierarchical attention layers. The system also includes an attentional scoring layer configured to evaluate the aggregated single-order feature representations to output a significance of each of the orders with respect to various Click-Through Rate (CTR) predictions. The system additionally includes a hierarchical interpretation layer configured to determine a respective importance of each of the input features in various input feature combinations from which the various CTR predictions are derived based on the aggregation attention weights and the significance of each of the orders with respect to the CTR predictions. The system further includes a display device configured to display each of the various input feature combinations for the various CTR predictions along with the respective importance of each of the constituent one of the input features in the various input feature combinations.

According to another aspect of the present invention, a method is provided for interpretable click viewing interest. The method includes deriving, by a transformer with multi-head self-attention, different hierarchical orders of input features by learning various semantic interactions of the input features in different semantic subspaces. The method further includes aggregating, by a plurality of hierarchical attention layers, the different hierarchical orders of the input features to obtain aggregated single-order feature representations starting from a first order and continuing to a k-th order. The method also includes deriving, by the plurality of hierarchical attention layers, aggregation attention weights for the different hierarchical orders of the input features based on an applied order of the plurality of hierarchical attention layers. The method additionally includes evaluating, by an attentional scoring layer, the aggregated single-order feature representations to output a significance of each of the orders with respect to various Click-Through Rate (CTR) predictions. The method also includes determining, by a hierarchical interpretation layer, a respective importance of each of the input features in various input feature combinations from which the various CTR predictions are derived based on the aggregation attention weights and the significance of each of the orders with respect to the CTR predictions. The method additionally includes displaying, by a display device, each of the various input feature combinations along with the respective importance of each of the constituent one of the input features in the various input feature combinations.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention are directed to interpretable Click-Through Rate (CTR) prediction through hierarchical attention.

In an embodiment, the present invention provides an Interpretable CTR prediction with Hierarchical Attention (InterHAt) that can provide reliable explanations together with accurate recommendations. The present invention quantifies the effects of feature combinations of arbitrary orders by a hierarchical attention mechanism and explains the recommending decision according to learned feature salience.

However, one impediment that degenerates the performance of important cross-feature detection is that factors may have conflicting influences on the CTR. For example, a record of $\{f_1$:movie.type=horror, $f_2$:user.type=young, $f_3$:event.time=8 am$\}$ has conflicting factors: $\{f_1; f_2\}$ encourages the click-through whereas $\{f_2; f_3\}$ inhibits it since movie watching usually happens at night. Therefore, the present invention is equipped with a Transformer with multi-head self-attention to comprehensively study different possible feature-wise interactions since multiple attention heads can capture manifold semantic information from different latent semantic sub-spaces. Self-attention, sometimes called intra-attention, is an attention mechanism relating different positions of a single sequence in order to compute a representation of the sequence.

In one or more embodiments, the present invention uses hierarchical attention to explain the CTR prediction by pinpointing the significant single features or multiple feature combinations that have great contributions to making the click-through. The present invention is able to efficiently handle high-order feature combinations within a linear complexity. As used herein, the term "high-order" refers to feature orders above the $2^{nd}$ order. The term "low-order" refers to feature orders below the $3^{rd}$ order.

In one or more embodiments, the present invention utilizes a Transformer with multi-head self-attention to thoroughly analysis possible interactive relations between features in different latent semantic subspaces.

Figure 1:
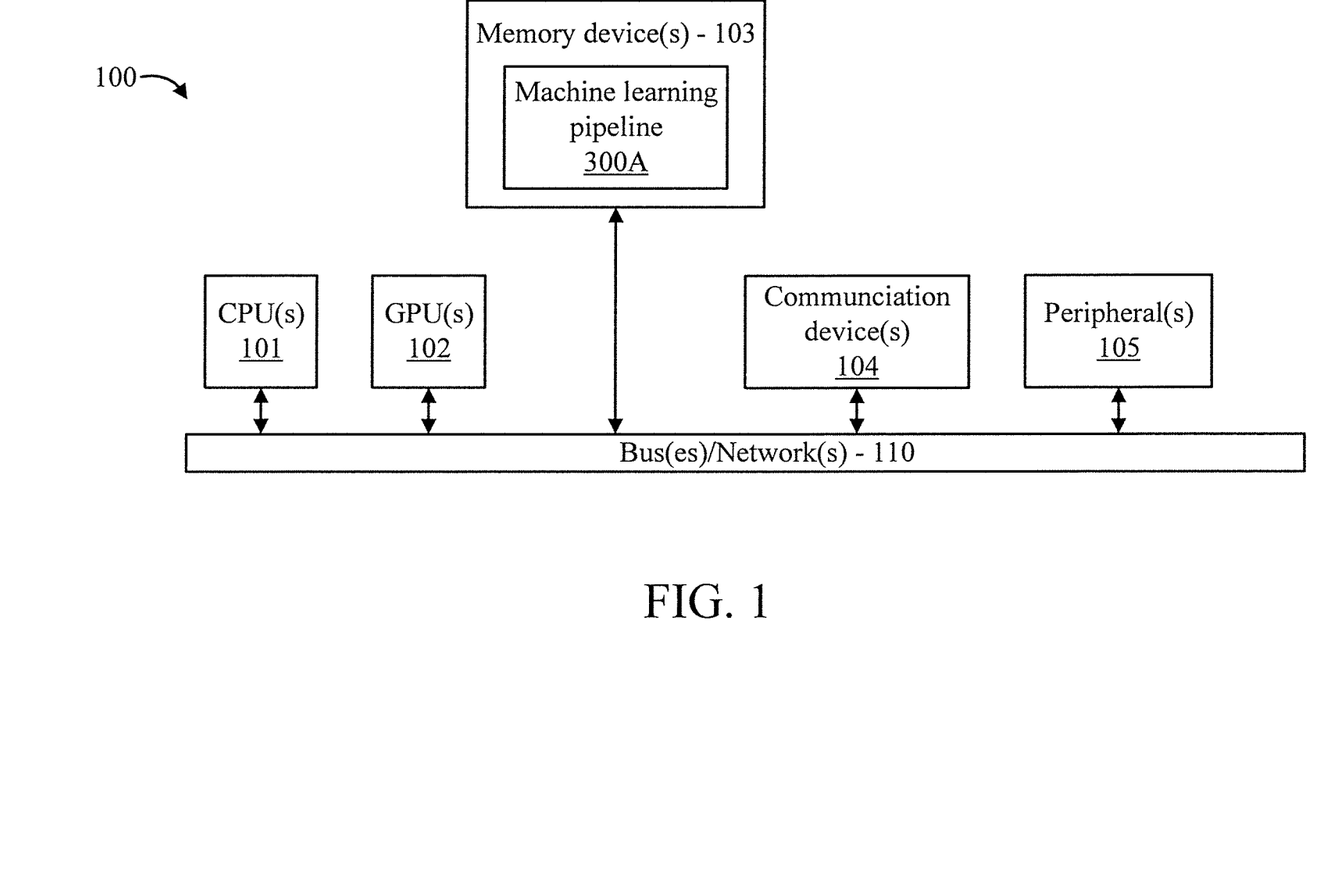
FIG. 1 is a block diagram showing an exemplary processing system, in accordance with an embodiment of the present invention.

FIG. 1 is a block diagram showing an exemplary processing system 100, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules to transform the computer processing system into a special purpose computer configured to implement various aspects of the present invention. In an embodiment, special purpose hardware (e.g., Application Specific Integrated Circuits, Field Programmable Gate Arrays (FPGAs), and so forth) can be used to implement various aspects of the present invention.

In an embodiment, memory devices 103 can include a machine learning pipeline 103A. In an embodiment, machine learning pipeline 103A can be implemented by the machine learning pipeline 300 of FIG. 3 described herein below.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Figure 2:
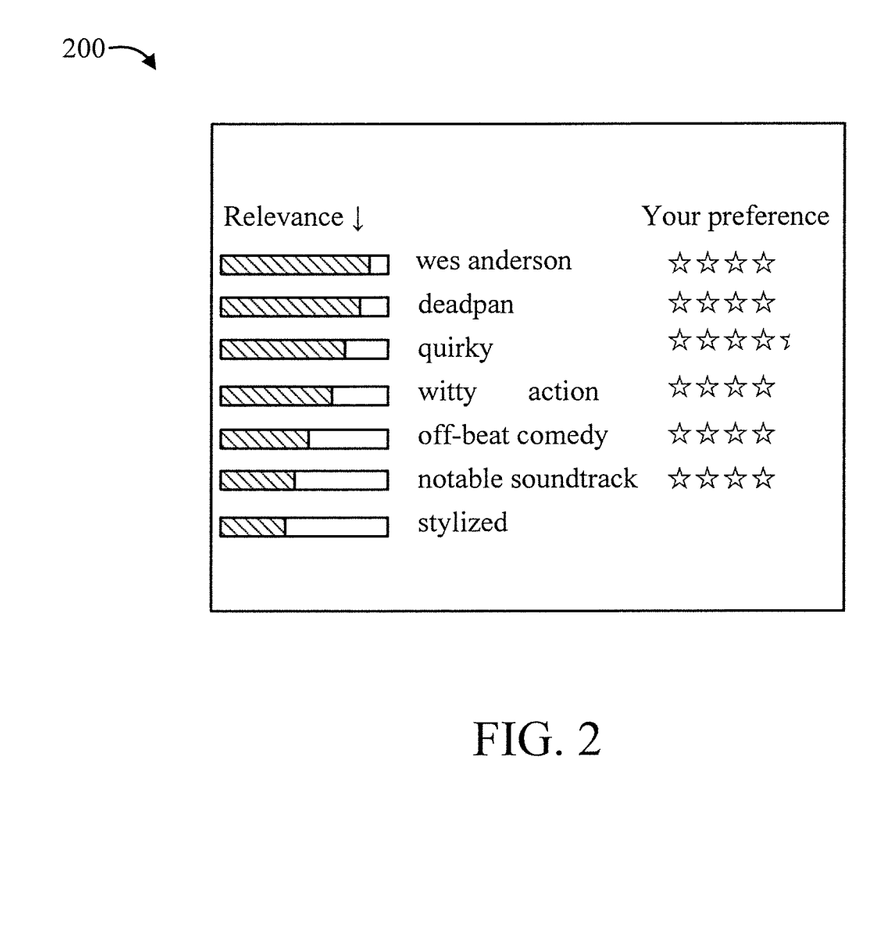
FIG. 2 is a diagram showing an exemplary output of an interpretable recommendation system, in accordance with an embodiment of the present invention.

FIG. 2 is a diagram showing an exemplary output 200 of an interpretable recommendation system, in accordance with an embodiment of the present invention.

The objective in providing the output is to explicitly explain factors (1-order features or high-order feature combinations) that contribute to the recommendation. As shown, the present invention may report the first order feature ("wes Anderson") and 2-order feature ("witty" and "action") for the film that play important parts in the recommendation.

Figure 3:
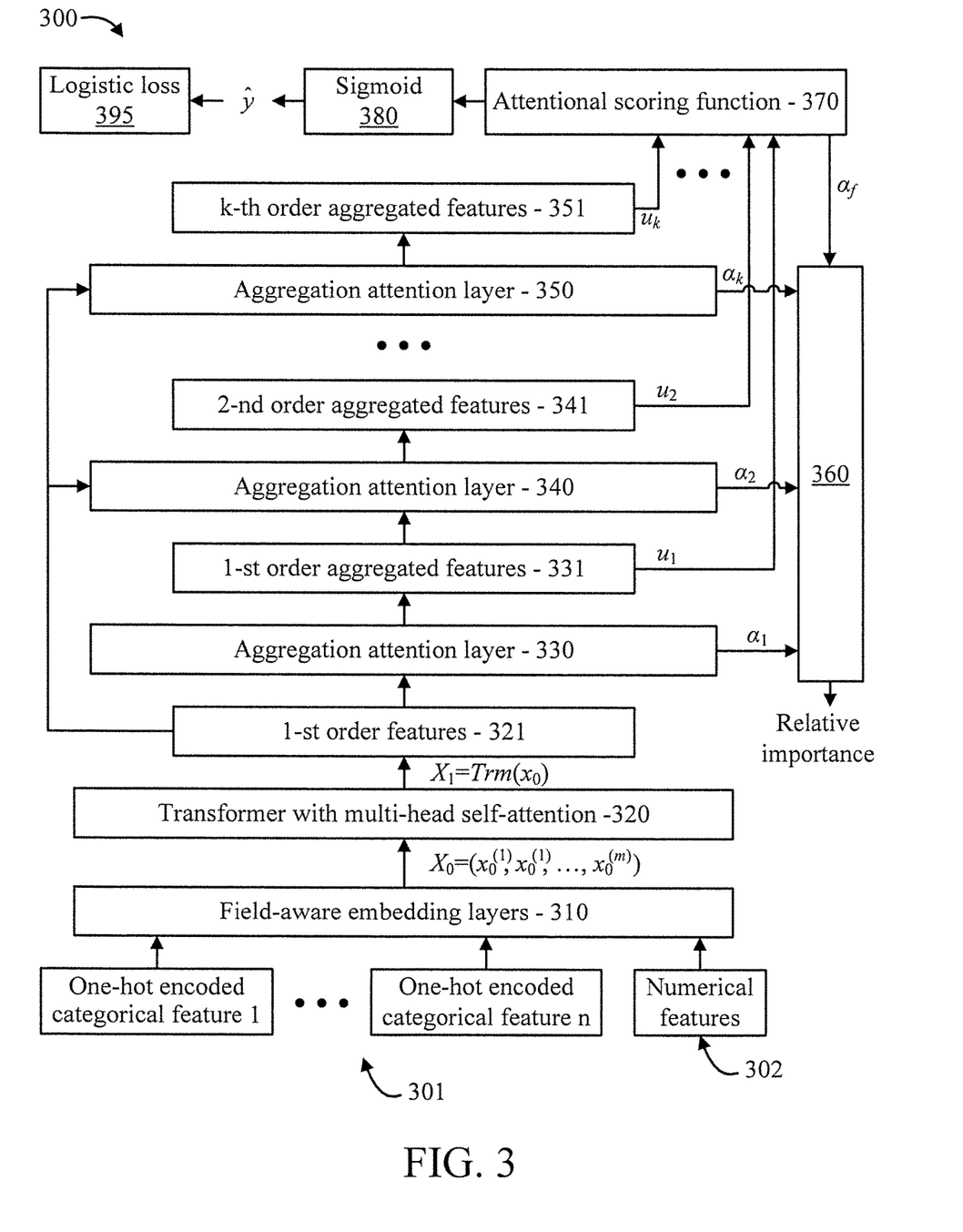
FIG. 3 is a block diagram showing an exemplary machine learning pipeline, in accordance with an embodiment of the present invention.

FIG. 3 is a block diagram showing an exemplary machine learning pipeline 300, in accordance with an embodiment of the present invention.

Basically, the pipeline 300 makes use of multi-head self-attention on embeddings of different 1-order fields. The, the pipeline 300 uses multi-layer high-order attention aggregation to capture cross-features and the final feature vectors are the concatenation of different orders of features.

The pipeline 300 includes one-hot encoded categorical features 1 through n, collectively denoted by the figure reference numeral 301, and further includes numerical features 302. The numerical data 302 can be in buckets. These features 301 and 302 represent click-through data. Each record of the click-through data includes userID, features of the user, itemID, feature of the item, and if the user clicked the item or the score of the rating the user gave to the item.

The features 301 and 302 are input to field-aware embedding layers 310, whose output is fed to a transformer 320 with multi-head self-attention. The transformer 320 outputs 1-st order features 321 to a first aggregation attention layer 330 that outputs 1-st order aggregated features 331. The 1-st order aggregated features 331 are input to a second aggregation attention layer 340 that outputs 2-nd order aggregated features 341. The 2-nd order aggregated features 341 are input to further aggregation layers (collectively designated by the figure reference numeral 345) up to a k-th aggregation layer 350 that outputs k-th order aggregation features 351.

Each of the aggregation attention layers 330, 340, and 345 is operatively connected to a hierarchical interpretation layer 360 which uses attention weights to interpret the relative importance of different features (or cross-features).

All of the aggregated attention features are input to an attentional scoring function 370 whose output is fed to a sigmoid function 380. The output of the sigmoid function 380 is a prediction $\hat{y}$. Also output from pipeline 300 is a logistic loss 395 that denotes how far away between the predicted values (1 means clicked, 0 means non-clicked) and the ground-truth values in the training set.

Feature embedding (mapping to a vector a real numbers) is a prerequisite for CTR prediction since the raw features are mostly categorical and not directly applicable to the numeric computations of deep learning models. For categorical features, we apply multi-field one-hot encoding to field-aware embedding layers for low-dimensional continuous-valued feature representations. A hierarchical attention layer includes two parts as follows: (i) a transformer 320 with multi-head self-attention; and (ii) a series of hierarchical attention layers 330, 340, 345, 350. Transformer 320 is powerful in capturing the rich pair-wise feature correlations by a multi-head self-attention module regardless of the orders of fields. The multiple attention heads learn the various feature interactions in different subspaces which represents manifold factors that affect the click-through. The second-order of attention is multi-head self-attention and the higher-order attention is the cross-layer attention.

Further regarding the field-aware embedding layers 310, the same map different features (fields) to low-dimensional embeddings (i.e., embedding having a dimension number of less than three). For fields with non-value multi-categories, using one-hot embedding first, then map to a low-dimensional space.

Further regarding the transformer with multi-head self-attention, for categorical features, the pipeline 300 applies multi-field one-hot encoding to field-aware embedding layers for low-dimensional continuous-valued feature representations. Given its the value of field f, $x_f$, and the embedding layer of f, $emb_f(.)$, the embedding of field f, $v_{f,cat}$ in $R^n$, is derived by $v_{f,cat}=emb_f(one-hot(x_f))$. The multiple attention heads learn the various feature interactions in different (semantic) subspaces which represents manifold factors that affect the click-through. Self-attention is computed not once but multiple times in the transformer's architecture, in parallel and independently.

Further regarding the sigmoid function, the same is applied to make the output prediction value to be between 0 and 1.

The elements of the machine learning pipeline 300 are described in further detail hereinbelow.

Figure 4:
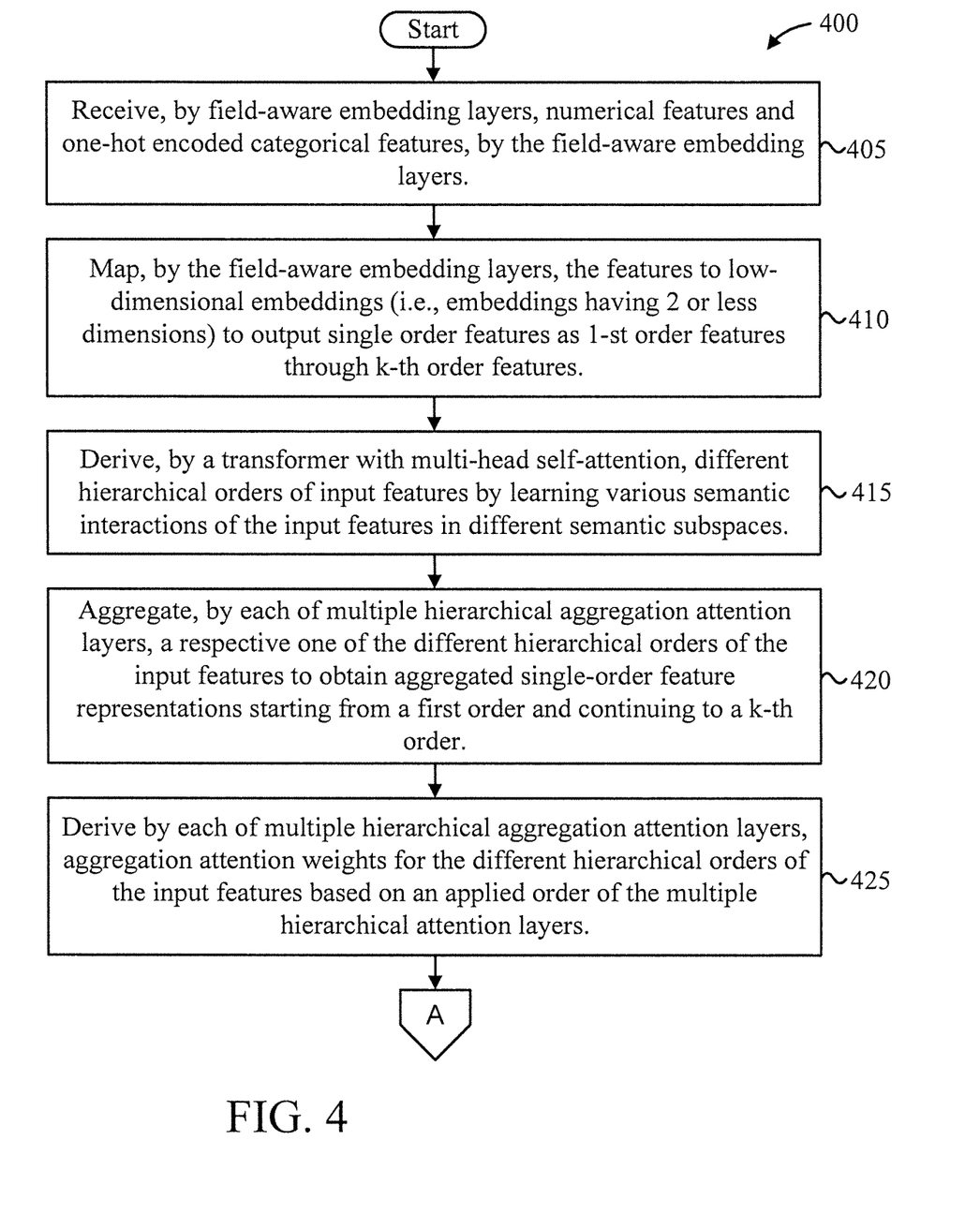
FIGS. 4-5 are flow diagrams showing an exemplary method for interpretable click-through prediction through hierarchical attention.
Figure 5:
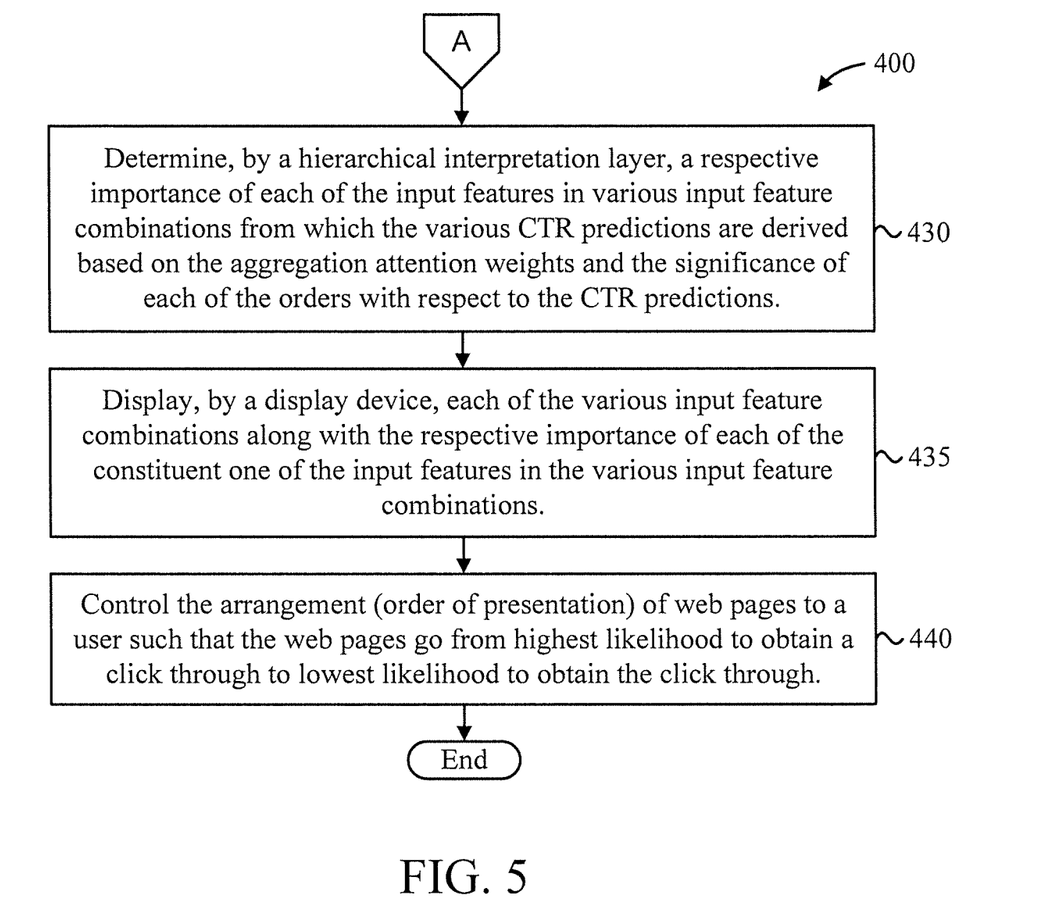

FIGS. 4-5 are flow diagrams showing an exemplary method 400 for interpretable click-through prediction through hierarchical attention.

At block 405, receive, by field-aware embedding layers, numerical features and one-hot encoded categorical features, by the field-aware embedding layers.

At block 410, map, by the field-aware embedding layers, the features to low-dimensional embeddings (i.e., embeddings having 2 or less dimensions) to output single order features as 1-st order features through k-th order features.

At block 415, derive, by a transformer with multi-head self-attention, different hierarchical orders of input features by learning various semantic interactions of the input features in different semantic subspaces.

At block 415, aggregate, by each of multiple hierarchical aggregation attention layers, a respective one of the different hierarchical orders of the input features to obtain aggregated single-order feature representations starting from a first order and continuing to a k-th order. Thus, for example, aggregate the 1-st order features by a first aggregation attention layer to obtain aggregated 1-st order features, aggregate the 2-nd order features by a second aggregation attention layer to obtain aggregated 2-nd order features, and so on up to aggregating the k-th order features by a k-th aggregation layer to obtain aggregated k-th order features.

At block 420, derive by each of multiple hierarchical aggregation attention layers, aggregation attention weights for the different hierarchical orders of the input features based on an applied order of the multiple hierarchical attention layers.

At block 425, evaluate, by an attentional scoring layer, the aggregated single-order feature representations to output a significance of each of the orders with respect to various Click-Through Rate (CTR) predictions At block 430, determine, by a hierarchical interpretation layer, a respective importance of each of the input features in various input feature combinations from which the various CTR predictions are derived based on the aggregation attention weights and the significance of each of the orders with respect to the CTR predictions.

At block 435, display, by a display device, each of the various input feature combinations along with the respective importance of each of the constituent one of the input features in the various input feature combinations. FIG. 2 shows one example screen shot from a display device that can correspond to block 435.

At block 440, control the arrangement (order of presentation) of web pages to a user such that the web pages go from highest likelihood to obtain a click through to lowest likelihood to obtain the click through. In this way, the change for a click through is maximized. Likelihoods can be derived from the output of the sigmoid function for each of the CTR predictions.

A further description will now be given regarding the embedding layers, in accordance with an embodiment of the present invention.

Feature embedding is a prerequisite for CTR prediction since the click-through records include discrete categorical terms that are not directly applicable to numerical computations. A click-through record includes a set of fields F and a binary label y as the ground truth representing whether a click-through is actually made. Each field $f \in F$ has either a categorical or a numerical value. Distinct values are defined as different features. For categorical fields, we apply multi-field one-hot encoding to field-aware embedding layers for low-dimensional real-valued feature representations. Specifically, each distinct feature value v of a field is assigned a trainable d-dimensional continuous vector as its representation. If a particular feature appears in a click-through as the field representation. For numerical fields, we assign one vector to each field as its embedding. Given $v_f$ as the normalized value of a numerical field f and $x_{num,0}^{(f)} \in \mathcal{R}^d$ as the trainable representation associated with this field, the representation of the feature, $x_{num}^{(f)} \in \mathcal{R}^d$, is derived by $x_{num}^{(f)} = v_f x_{num,0}^{(f)}$. The initial input representation matrix is $X_0 = (x_0^{(1)}, x_0^{(2)}, \ldots, x_0^{(m)})$ where m=|F|.

A further description will now be given regarding the multi-head transformer, in accordance with an embodiment of the present invention.

The transformer is prevalent in NLP thanks to the outstanding power to learn the co-effects to the text semantics of word pairs within a sentence or across sentences regardless of the orders and distances of the words. In the context of CTR prediction, we define the coeffects of the features, i.e., feature interactions, towards different polarity as the "polysemy". Therefore, we equip the present invention with a multi-head self-attention based Transformer to capture the rich pair-wise feature interactions and learn the diversified polysemy of feature interactions in different semantic subspaces, i.e., diversified implications towards the CTR in different click-through contexts.

Given the input matrix $X_0$ that includes the learnable embeddings of features of a training CTR record, the latent representation $H_i$ of Transformer head i is obtained by a scaled dot-product attention, $$H_i = \mathrm{sotmax}_i\left(\frac{QK^T}{\sqrt{d_K}}\right)V, Q = QW_i^{(Q)}X_0, K = W_i^{(K)}X_0, V = W_i^{(V)}X_0.$$

Matrices $W_i^{(Q)} \in \mathrm{R}^{d_K \times d}$, $W_i^{(K)} \in \mathcal{R}^{d_K \times d}$, and $W_i^{(V)} \in \mathcal{R}^{d_K \times d}$ are weight parameters to learn for head i and $d_K$ denotes the dimension of K and $H_i \in \mathrm{R}^{d_K \times m}$.

A combination of hidden features Hi forms an augmented representation matrix X1 that preserves both the intrinsic and polysemic information of each feature. Computationally, we use concatenation followed by a feed-forward layer and a ReLU for the combination to learn the non-linearity of the combined information as $X_1 = \mathrm{ReLU}(\mathrm{FeedForward}(W_m[H_1; H_2; \ldots; H_h]))$, where $W_m \in \mathcal{R}^{d \times hd_k}$ includes the weights and h is the number of attention heads and ";" denotes the concatenation of matrices. The $X_1 \in \mathcal{R}^{d \times m}$ is the matrix with polysemy-augmented features and ready to be sent to the hierarchical attention layer for explainable CTR prediction.

A description will now be given regarding hierarchical attention, in accordance with an embodiment of the present invention.

The augmented feature matrix X1 is served as the input of the hierarchical attention layers which learn the feature interaction and generate interpretations simultaneously. However, computing the high-order multi-feature interactions by enumerating all possible combinations is expensive due to the combinatorial explosion. Such potential expense motivates the aggregation of the current order before proceeding to the computation of the higher order. That is, in order to generate the (i+1)-th order cross-features $X_{i+1}$, we first aggregate the i-th layer hidden features to $u_i$ as a summarization of $X_i$. The interaction between $X_i$ and $X_1$, from which we derive $X_{i+1}$, is computed by the proxy of $X_i$, i.e., the attentional aggregation $u_i$ from Equation (1), and $X_1$. Mathematically, given the i-th feature matrix $X_i = (x_i^{(1)}, \ldots, x_i^{(m)})$, its attentional aggregation representation $u_i$ is as follows:

$$u_i = \mathrm{AttentionalAgg}(X_i) = \Sigma_{j=1}^m \alpha_i^{(j)} x_i^{(j)} \quad (1)$$

where $\alpha_i^{(j)} \in \mathcal{R}$ denotes the attention on the j-th field in the i-th attentional aggregation layer. $a_i^{(j)}$ is computed by the following:

$$\alpha_i^{(j)} = \frac{\exp\left(c_i^T \mathrm{ReLU}(W_i x_i^{(j)})\right)}{\Sigma_{f' \in f} \exp\left(c_i^T \mathrm{ReLU}(W_i x_i^{(f')})\right)} \quad (2)$$

where $W_i \in \mathcal{R}^{s \times d}$ is the weight of layer i, $c_i \in \mathrm{R}^s$ is the context vector of layer i, and s denotes the attention space size. Note that other attention mechanisms can also be adopted here, such as the gated attention mechanism. Using $u_i$ and $X_i$, we derive x(j) i+1 in $X_{i+1}$ by a cross-product transformation as follows:

$$x_{i+1}^{(j)} = u_i \circ x_1^{(j)} + x_i^{(j)}, j \in \{1, \ldots, m\} \quad (3)$$

where ∘ denotes the Hadamard product of two vectors.

Recurrently applying Equation (1) and Equation (3) produces $u_i$ and $X_i$ for feature orders from the 1st order to the k-th, the highest cross-feature order to analyze, by a series of attentional aggregation layers. These layers composite a hierarchy that extracts features from low order to higher ones and the lower ones contribute to the construction of one-order higher features using the proposed attentional aggregation and cross-product transformation.

As the last step, we combine attentional aggregations $U=(u_1, u_2, \ldots, u_k)$ to predict the probability of click-through. U gathers all combinatorial feature semantics of k orders. By modifying k, the present invention is able to capture arbitrary order of feature interactions, and yet avoids the exponential cardinality of high-order feature combinations.

A further description will now be given regarding the objective function and optimization, in accordance with an embodiment of the present invention.

The final CTR prediction function $g(U) = \hat{y} \in [0,1]$ maps U to a probability that quantifies the CTR. g(U) is implemented as the following. It first computes the attentional aggregation of U by Equation (4) and Equation (5) to obtain its aggregation $u_f \in \mathcal{R}^d$ and attention $u_f \in \mathcal{R}^k$ as follows:

$$u_f = \mathrm{Attentional}\, Agg(U) = \sum_{j=1}^K \alpha_f^{(j)} u_f \quad (4)$$

$$\alpha_f^{(j)} = \frac{\exp\,(c_f^T \mathrm{ReLU}(W_f u_j))}{\Sigma_{f' \in (1,\ldots,k)} \exp\,(C_f^T \mathrm{ReLU}(W_f u_f))} \quad (5)$$

where αf is the importance distribution across k feature orders, $c_f$ and $W_f$ are learnable parameters. Finally, the prediction $\hat{y}$ is then made by $\hat{y} = \mathrm{sigmoid}(\mathrm{MLP}(u_f))$ where MLP(·) refers to a shallow Multi-layer Perceptron that reduces the output dimension from d to 1. The objective function, Equation (6), of the present invention is a cross entropy loss of binary classification as follows:

$$\mathcal{L}(\Theta) = \Sigma_{t \in D}[-y_t \log(\hat{y}_t) - (1-y_t)\log(1-\hat{y}_t)] + \lambda \|\Theta\|_2 \quad (6)$$

where D denotes the training set and $\Theta$ includes all trainable parameters, namely feature embeddings and the parameters of Transformer and hierarchical layers. An L2 regularization weighted by $\lambda$ is applied to $\Theta$ to prevent overfitting. In an embodiment, we optimize Equation (6) by the Adam or other gradient descent optimizer.

A further description will now be given regarding interpretation, in accordance with an embodiment of the present invention.

The description elaborates on how to "understand" the attentions in the hierarchy as important factors that trigger the prediction of CTR. Note that the attention mechanism only highlights the salience of features so it is not expected to generate completely human readable interpretations.

Here is a walk-through of the interpretation using the salience distribution $(\alpha_1, \alpha_2, \ldots, \alpha_k)$ and $\alpha_f \alpha_f$ includes the significance of all k orders of features and signifies the feature orders that are influential to the ultimate CTR prediction. Dominant weights in $\alpha_f \in \mathcal{R}^k$ pinpoint the $X_i$'s that include significant i-th order features. According to $\alpha_f$, we learn the numbers of orders, i.e., the numbers of interacting features, that have the strongest impact to encourage the user to click through the recommended ads. The attention weights in corresponding $\alpha i$ identify the candidate individual features that participate in the contributory i-th order features. For example, if the attention weights of features of fields $f_1$ and $f_2$, i.e., $\alpha_i [f_1]$ and $\alpha_i [f_2]$, outweigh the rest of the features in $\alpha i$, we learn that features of field $f_1$ and $f_2$ both contribute to an i-th order feature since they actively interact with the i–1 order aggregation features. Finally, following the above steps, we can identify all features in different orders. The actual click-through is interpreted by identifying salient features layer by layer and order by order.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A system for interpretable click-through rate prediction, comprising:

a transformer with multi-head self-attention configured to derive different hierarchical orders of input features by learning various semantic interactions of the input features in different semantic subspaces;

a plurality of hierarchical attention layers configured to (i) aggregate the different hierarchical orders of the input features to obtain aggregated single-order feature representations starting from a first order and continuing to a k-th order and (iii) derive aggregation attention weights for the different hierarchical orders of the input features based on an applied order of the plurality of hierarchical attention layers;

an attentional scoring layer configured to evaluate the aggregated single-order feature representations to output a significance of each of the orders with respect to various Click-Through Rate (CTR) predictions;

a hierarchical interpretation layer configured to determine a respective importance of each of the input features in various input feature combinations from which the various CTR predictions are derived based on the aggregation attention weights and the significance of each of the orders with respect to the CTR predictions; and a display device configured to display each of the various input feature combinations for the various CTR predictions along with the respective importance of each of the constituent one of the input features in the various input feature combinations, wherein the various semantic interactions of the input features in the different semantic subspaces are learned by the transformer with multi-head self-attention by learning co-effects to text semantics of word pairs one of within a sentence or across multiple sentences regardless of the orders and distances of words in the word pairs, the word pairs being input feature values.

2. The system of claim 1, further comprising a plurality of field-aware embedding layers for generating feature embeddings from sets of categorical and numerical fields.

3. The system of claim 1, further comprising a plurality of feature-aware embedding layers configured to map different ones of the input features to low-dimensional feature embeddings having less than three dimensions.

4. The system of claim 1, wherein the transformer with multi-head self-attention processes categorical features and numerical as the input features.

5. The system of claim 4, wherein the categorical features are one-hot embedded prior to being processed by the transformer with multi-head self-attention.

6. The system of claim 1, further comprising a sigmoid function configured to generate each of the various predictions jointly based on the concatenated 1-order features and attention pooling vectors.

7. The system of claim 1, wherein the respective importance relates to a relevance degree of a particular one of the input features to a particular one of the various predictions.

8. The system of claim 1, wherein the feature interactions represent manifold factors that affect different ones of the various CTRs.

9. The system of claim 1, wherein the input feature lack temporal correlations.

10. The system of claim 1, wherein the aggregation attention weights are layer based such that different layers have different values for the aggregation attention weights.

11. The system of claim 1, wherein the significance indicates the orders of interacting ones of the input features having a highest impact to encourage a user to follow through on a given one of the various CTR predictions.

12. The system of claim 1, wherein the hierarchical interpretation layer interprets the various CTR predictions layer-by-layer and order-by-order.

13. The system of claim 1, wherein the transformer with multi-head self-attention learns the various semantic interactions of the input features in the different semantic subspaces by learning co-effects to text semantics of word pairs one of within a sentence or across multiple sentences regardless of the orders and distances of words in the word pairs, the word pairs being input feature values.

14. The system of claim 1, wherein the transformer with multi-head self-attention derives the different hierarchical orders of the input features based on pair-wise interactions of the input features.

15. The system of claim 1, wherein the transformer with multi-head self-attention, the plurality of hierarchical attention layers, the attentional scoring layer, and the hierarchical interpretation layer are comprised in a machine learning pipeline.

16. The system of claim 1, further comprising a hardware processor configured to control an order of presentation of web pages to a user such that the web pages go from highest likelihood to obtain a click through to lowest likelihood to obtain the click through responsive to each of the various input feature combinations for the various CTR predictions along with the respective importance of each of the constituent one of the input features in the various input feature combinations.

17. A method for interpretable click-through rate prediction, comprising:

deriving, by a transformer with multi-head self-attention, different hierarchical orders of input features by learning various semantic interactions of the input features in different semantic subspaces;

aggregating, by a plurality of hierarchical attention layers, the different hierarchical orders of the input features to obtain aggregated single-order feature representations starting from a first order and continuing to a k-th order;

deriving, by the plurality of hierarchical attention layers, aggregation attention weights for the different hierarchical orders of the input features based on an applied order of the plurality of hierarchical attention layers;

evaluating, by an attentional scoring layer, the aggregated single-order feature representations to output a significance of each of the orders with respect to various Click-Through Rate (CTR) predictions;

determining, by a hierarchical interpretation layer, a respective importance of each of the input features in various input feature combinations from which the various CTR predictions are derived based on the aggregation attention weights and the significance of each of the orders with respect to the CTR predictions; and displaying, by a display device, each of the various input feature combinations along with the respective importance of each of the constituent one of the input features in the various input feature combinations, wherein the various semantic interactions of the input features in the different semantic subspaces are learned by the transformer with multi-head self-attention by learning co-effects to text semantics of word pairs one of within a sentence or across multiple sentences regardless of the orders and distances of words in the word pairs, the word pairs being input feature values.

18. The computer-implemented method of claim 17, wherein the significance indicates the orders of interacting ones of the input features having a highest impact to encourage a user to follow through on a given one of the various CTR predictions.

19. The computer-implemented method of claim 17, wherein the various CTR predictions are interpreted by the hierarchical interpretation layer in layer-by-layer and order-by-order.

* * * * *